United States Patent [19]

Thomas

[11] 4,380,841
[45] Apr. 26, 1983

[54] OIL DIP STICK WIPER UNIT
[75] Inventor: Robert R. Thomas, Hartford, Kans.
[73] Assignee: Hopkins Manufacturing Corporation, Emporia, Kans.
[21] Appl. No.: 237,862
[22] Filed: Feb. 25, 1981
[51] Int. Cl.³ .......................................... F01M 11/12
[52] U.S. Cl. .................................................. 15/210 B
[58] Field of Search .............. 15/210 B, 160, 210 A, 15/218.1

[56] References Cited
U.S. PATENT DOCUMENTS

| | | | |
|---|---|---|---|
| 1,947,833 | 2/1924 | Dolbier | 15/210 |
| 2,810,923 | 10/1957 | Desso | 15/210 |
| 3,686,702 | 8/1972 | Jordan | 15/210 B |
| 4,023,231 | 5/1977 | Haber | 15/210 B |
| 4,103,388 | 8/1978 | DeVitis | 15/210 B |
| 4,207,645 | 6/1980 | Suckling | 15/210 B |

Primary Examiner—Edward L. Roberts
Attorney, Agent, or Firm—Lahive & Cockfield

[57] ABSTRACT

An oil dip stick wiper has two hinged opposing wiping blocks with pads having opposing wiping faces biased apart by a leaf spring. The wiper has projecting grips on the outside of the wiping blocks. A walled storage container open at one end has slots in its walls to receive the closed wiper and allow access to the grips for insertion and removal of the wiper.

4 Claims, 8 Drawing Figures

OIL DIP STICK WIPER UNIT

BACKGROUND

This invention relates to oil dip stick wipers and particularly to a wiper unit that includes a wiper and storage container for the wiper.

The almost universal method for checking the lubricating oil level in internal combustion engines is the insertion of a dip stick into the oil reservoir. The oil clings to the length of the dip stick that dips below the surface of the oil and readily indicates, on a properly calibrated dip stick, the amount of oil present.

Ordinarily, the dip stick is housed in a passage that gives it access to the oil reservoir. Use of the engine results in oil splattering the dip stick so that if it is removed after use of the engine, it is generally covered with oil. To use the dip stick properly, then, it is necessary to wipe it clean before inserting it to test the oil level.

Unfortunately the properties of oil make it a dirty job to wipe the dip stick. Anything used to wipe it has to be discarded rather than be cleaned. As a result, the ordinary user of a car or truck who does not have handy a cloth or similar item to wipe a dip stick, that can later be discarded, often foregoes the opportunity to check the oil level.

Various devices have been developed to alleviate this problem. Oil dip stick wipers that are mounted or stored in the engine compartments are some of them. Wipers that are mounted in the compartment, however, often turn out to be awkward to use. Wipers that are stored in the compartment often have difficult or complex storing procedures.

It is an object of this invention to provide an improved oil dip stick wiper and storage unit. It is also an object to provide such a unit that is simple and inexpensive to manufacture. A further object is to provide such a unit that is convenient to use, and that allows easy and compact storage of the wiper.

SUMMARY OF THE INVENTION

The invention features an oil dip stick wiping device comprising a wiper having a first wiping block having a first inside wiping face portion and a second wiping block having a second inside wiping face portion in opposing relation to the first wiping face portion, the first and second wiping blocks being hingedly connected so that the blocks may be urged together with a dip stick between them so that the dip stick may be wiped by the wiping face portions as the dip stick is drawn between them, and a storage container having walls defining a receptacle with an open end for telescopingly, insertably receiving the wiper, having a wall extending from the open end defining a slot extending in the direction of insertion of the wiper.

The invention also features one of the wiping blocks having an outside grip adapted to be aligned with the slot and accessible through the slot after insertion, so that the wiper can be conveniently removed from the storage container. It also features the wiping blocks including a rigid back and a compressible pad including the wiping face portion, mounted on the inside of the back, the back forming a projecting grip.

BRIEF DESCRIPTION OF THE DRAWING

Other objects, features and advantages of the invention will be pointed out, or be inherent in, the following description of a preferred embodiment of the invention, including the drawing thereof, in which.

DESCRIPTION OF THE PREFERRED EMBODIMENT

Figure 5:
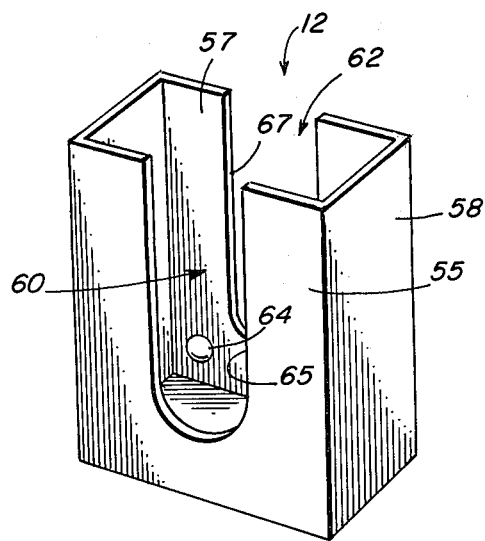
FIG. 5 is a perspective view of a wiper storage container.
Figure 6:
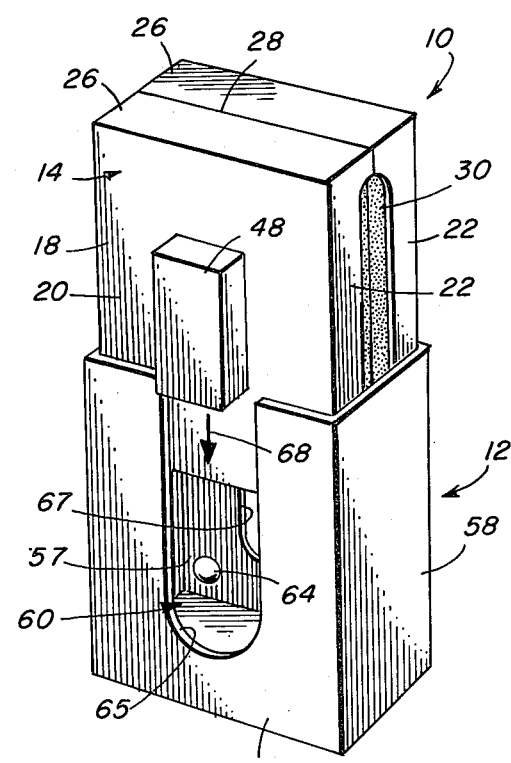
FIG. 6 is a perspective view of the wiper of FIG. 1 being inserted into the storage container.
Figure 7:
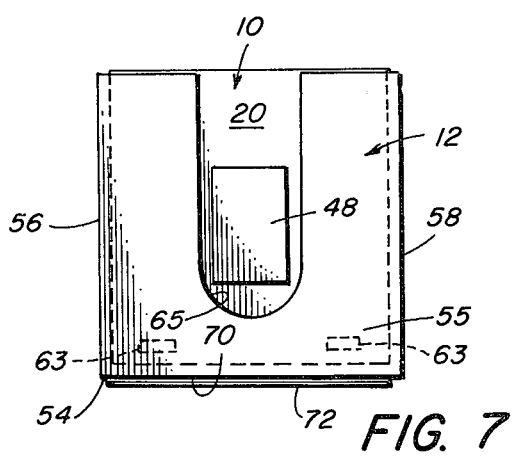
FIG. 7 is a side elevation view of the storage container with the wiper fully inserted in it.

The preferred embodiment of the unit includes a wiper 10 (FIGS. 1–4), and a storage container 12 (FIG. 5), the wiper 10 being insertable into the container 12 (FIGS. 6 and 7).

The wiper 10 includes two oppositely facing wiping blocks 14, 16. Each wiping block 14, 16 has a hard, or rigid, plastic tray 18 with an outside wall 20, side walls 22, a top wall 24, and a bottom wall 26. The wiping blocks 14, 16 are hingedly connected by a "living hinge" 28, a thin plastic web element extending from one to the other of the bottom walls 26 of the wiping blocks 14, 16. The hinge 28 is molded in a conventional manner together with the trays 18 of the wiping blocks 14, 16.

A block 30 of compressible, porous plastic foam for wiping an oil dip stick is divided into first and second pads 38 and 40. An opening 32 between the two pads 38, 40 is defined by oppositely facing wiping faces 34 and 36, on the first and second pads 38 and 40 which are press fit into the trays of first and second wiping blocks 14 and 16 respectively.

Figure 4:
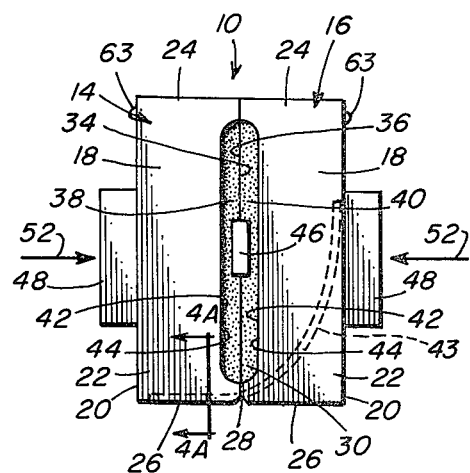
FIG. 4 is a view like FIG. 3 except that the wiper is closed, in its wiping position.

The side walls 22 of each wiping block 14, have central cut away portions 42 on their inside, oppositely facing, edges 44, so that the side walls 22 do not interfere with a dip stick 46 placed between the wiping faces 34 and 36 when the wiping blocks 14 and 16 are closed (see FIG. 4).

Figure 1:
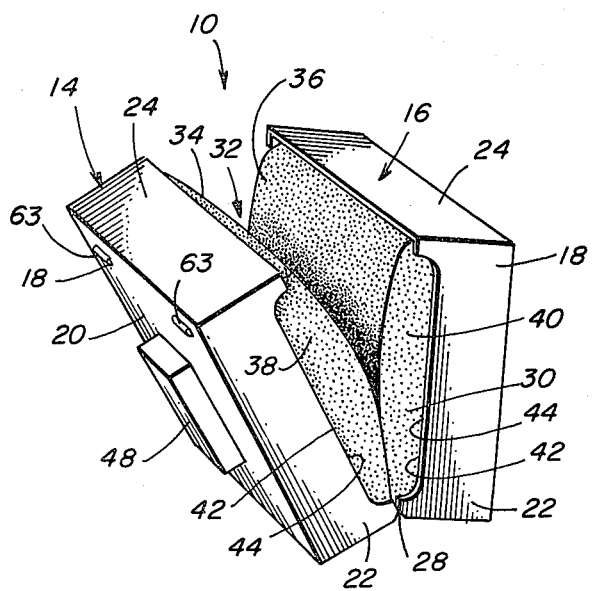
FIG. 1 is a perspective view, from above, of a oil dip stick wiper.
Figure 2:
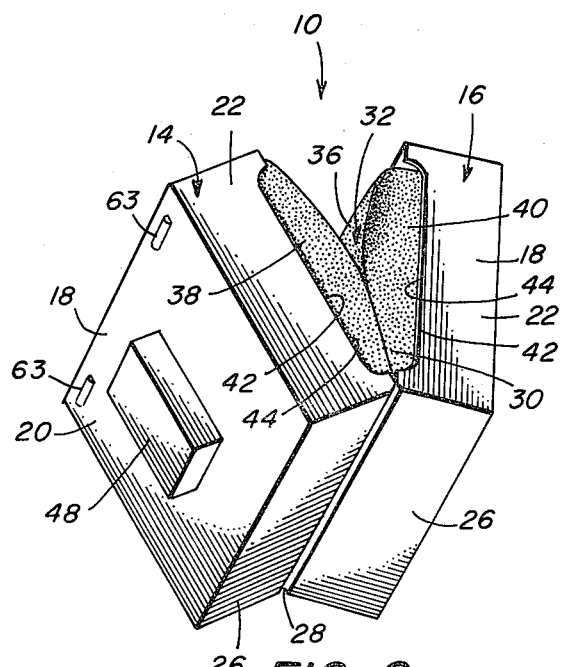
FIG. 2 is a perspective view of the wiper of FIG. 1 from below.
Figure 3:
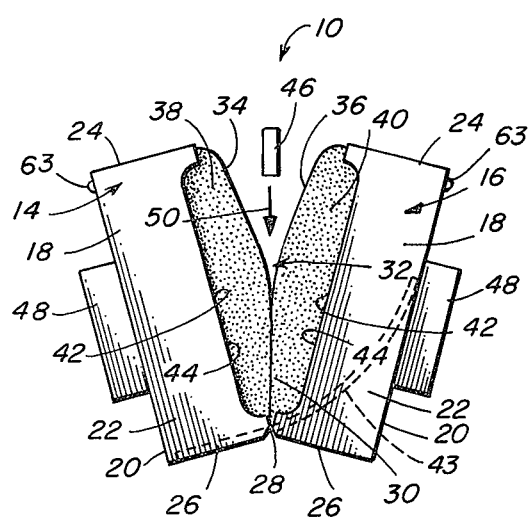
FIG. 3 is a side elevation view of the wiper in its open position.
Figure 4A:
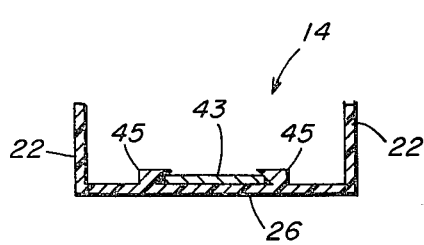
FIG. 4a is a cross-section detail view of a portion of the wiper of FIG. 1 (along the lines 4A—4A of FIG. 4), showing a spring that biases the wiper portions apart.

A steel leaf spring 43 is inserted under molded plastic retaining elements 45 on the inside of bottom wall 26 of the tray 18 of one wiping block 14 and extends across to the other wiping block 16 and up the inside of its side wall 20 (see FIG. 4A). The result is that leaf spring 43 acts to positively bias the wiping blocks 14, 16 apart as shown in FIG. 3.

Each wiping block 14 and 16 has mounted on the outside wall 20, in a central position, a grip 48, a projecting element formed as part of, or affixed to, the wall 20.

The wiper 10 is used by laying the oil dip stick 46 in the opening 32 (in the direction shown by the arrow designated 50 in FIG. 3), and then squeezing the wiping blocks 14 and 16 together by pressure on the grips 48 (in the direction shown by the arrow designated 52 in FIG. 4). The dip stick 46 is then caught snugly between the wiping faces 34 and 36 of the wiping blocks 14 and 16, and drawing it along (in a direction perpendicular to the plan of the drawing of FIG. 4) will wipe oil off the dip stick 46 so that it can be used for its purpose of indicating oil level.

The wiper storage container 12 (see FIG. 5) is an integral walled structure having a bottom wall 54 of a material such as plastic and four side walls 55, 56, 57 and 58, also of plastic, extending upwardly from the perimeter of the bottom wall 54 to form a cavity 60 with an open upper end 62. The dimensions of the cavity 60 are selected to conform to the outer dimensions of the wiper 10 in its closed position, so that the wiper 10 may be telescopingly inserted into the storage container 12. The leaf spring 43 urges the wiping blocks 14 and 16 outward. When the closed blocks 14 and 16 are inserted into the storage container 12, therefore, a friction fit is obtained because of the outward pressure of the wiping blocks 14 and 16 on the interior of the walls of the storage container 12.

Molded plastic tabs 63 project outwardly at the corners of the exterior of the tray side walls 20 opposite the hinged end of the wiper 10. There are corresponding inwardly extending molded bumps 64 on the bottom corners of the container walls 55, 57. When the wiper 10 is inserted into the container 12 the tabs 63 are captured below the bumps 64 to help retain the wiper 10 in the container 12.

Two parallel side walls 55 and 57 of the storage container 12 correspond to the outside walls 20 of wiping blocks 14 and 16, on which the wiper grips 48 are located. Each wall 55, 57 forms a slot 65, 67 extending from the open end 62 of the container 12, in the direction of insertion of the wiper 10 (shown by the arrow designated 68 in FIG. 6), to near the bottom wall 54 of the container 12. The location, width, and depth of the slots 65, 67 are selected to accommodate the projecting grips 48 of the wiper as the wiper is inserted into the storage container 12. The slots 65, 67 allow access to the grips 48, through the slots, when the wiper 10 is fully inserted into the container 12, so that the wiper 10 may be easily removed.

The bottom wall 54 of the storage container 12 has on its exterior surface 70 an adhesive 72 to affix the container 12 to some convenient surface in the compartment of the engine for which the wiper 10 will be used.

The unit is used by affixing the container 12, with the wiper 10 contained in it, to some engine compartment surface (not shown in the drawing), where the wiper 10 is accessible and may be easily removed. The wiper 10 may be removed and used, as described above, to wipe clean an oil dip stick 46. The positive action of the leaf spring 43 causes the wiping blocks 14 and 16 to spring apart to take the position shown in FIG. 3 when the wiper 10 is removed from the container 12. After the dip stick 46 is cleaned (see FIG. 4), the wiper 10 is returned to the storage container 12.

The wiping blocks 14 and 16 are squeezed together by the gips 48 and the wiper 10 is inserted into the container 12 (as shown in FIG. 6) until the tabs 63 snap under the container wall bumps 64. The fingers of the user's hand may continue to hold the grips 48 during insertion. After insertion, the wiper 10 is compactly stored. The wiper 10 may subsequently be removed again conveniently by grasping the wiper grips 48, accessible through the slots 65 and 67, and pulling out the wiper.

ADVANTAGES OF THE INVENTION AND NON-OBVIOUSNESS

The invention provides a handy, extremely compact, oil dip stick wiper and storage container. The compact size makes the unit available for affixation to many convenient surfaces of the engine compartment (or elsewhere). The wiper 10, despite its compact size, is easy to insert and remove from the storage container 12, and easy to use to wipe an oil dip stick.

The use of wipers with opposing pads, and in some cases, storage devices for the wipers, are shown in such U.S. Patents as Dolbier (No. 1,947,833), Desso (No. 2,810,923), Jordan (No. 3,686,702), DeVitis (No. 4,103,388), Haber (No. 4,023,231), and Suckling (No. 4,207,645). None of these patents, however, show the compact arrangement of elements of the invention.

The preferred embodiment described above is illustrative, and changes to the embodiment may be made without departing from the spirit of the invention. For example, the grips of the wiper may take different forms, and might even take the form of recesses in the wiping blocks rather than projections; the grip may be on just one of the blocks, although having a symmetrical arrangement seems more convenient to use and handle. Other similar additions, subtractions or modifications can be made by those skilled in the art, and will fall within the scope of the invention, as defined by the following claims.

What is claimed is:
1. An oil dip stick wiping device comprising:
    means for wiping said dip stick, comprising:
        a first wiping block having a first inside wiping face portion,
        a second wiping block having a second inside wiping face portion, in opposing relation to said first wiping face portion
    means for hingedly connecting said first and said second wiping blocks whereby said first and second wiping blocks may be urged together after said dip stick has been inserted between so that said dip stick may be wiped by said first and second wiping face portions as said dip stick is drawn between them and
    first and second outside gripping means on said first and second wiping blocks, respectively, for gripping said wiping means and urging said wiping blocks together and for inserting said wiping means into a means for storing said wiping means, and
    means for storing said wiping means when said wiping means is not in use, comprising:
        walls defining a receptacle with an open end for telescopingly insertably receiving said wiping means including
        a wall extending from said open end defining a slot extending in the direction of insertion of said wiping means,
        said first and second outside gripping means being operable by hand to prevent separation of said wiping blocks during removal from said means for storing said wiping means and to manipulate said wiping means free from hand contact with said first and second inside wiping face portions, at least one of said outside gripping means being engageable through said slot for removal of said wiping means.
2. The device of claim 1 in which said first and second wiping blocks each have outside wall portions parallel to the direction of wiping of said dip stick and each said gripping means projects outwardly from one of said wall portions.

3. The device of claim 1, further including spring biasing means for urging said first and second wiping blocks apart.

4. An oil dip stick wiping device, comprising:
 means for wiping said dip stick, comprising:
  a first wiping block having a first inside face portion and a first exterior portion parallel to said first inside face portion defining a first gripping means,
  a second wiping block having a second inside wiping face portion and a second exterior portion parallel to said second inside face portion defining a second gripping means,
  whereby a dip stick may be wiped by said first and second wiping face portions as said dip stick is drawn between them, and
 means for storing said wiping means, comprising:
  walls defining a cavity with an open end for telescopingly insertably receiving said wiping means, including
  walls extending from said open end defining slots extending from said open end,
  said slots extending in the direction of insertion of said wiping means, said first and second gripping means projecting from said first and second wiping blocks respectively so that said first and second gripping means extend into said slot, whereby said gripping means are accessible through said slots after insertion.

* * * * *